United States Patent [19]

Figinski

[11] Patent Number: 5,106,001

[45] Date of Patent: Apr. 21, 1992

US005106001A

[54] BICYCLE MAP HOLDER/SECONDARY RETENTION DEVICE

[75] Inventor: Paul A. Figinski, Monkton, Md.

[73] Assignee: Herman Miller, Inc., Zeeland, Mich.

[21] Appl. No.: 638,214

[22] Filed: Dec. 31, 1990

[51] Int. Cl.$^5$ .................. B62J 11/00; B62J 27/00
[52] U.S. Cl. .................... 224/31; 224/30 A; 224/41; 40/904; 280/288.4
[58] Field of Search ............ 224/30 R, 30 A, 31, 224/32 R, 36, 39, 41; 40/904; 280/29, 200, 263, 274, 281.1, 288.4

[56] References Cited

U.S. PATENT DOCUMENTS

| | | | |
|---|---|---|---|
| 2,321,192 | 6/1943 | Fischer | 224/36 |
| 4,043,688 | 8/1977 | Humlong | 403/209 |
| 4,800,664 | 1/1989 | Marstall | 224/30 A |
| 4,828,151 | 5/1989 | Goss | 224/30 A |

FOREIGN PATENT DOCUMENTS

| | | | |
|---|---|---|---|
| 3411022 | 10/1985 | Fed. Rep. of Germany | 224/36 |
| 600560 | 11/1925 | France | 224/41 |
| 7702417 | 9/1977 | Netherlands | 224/36 |
| 8500659 | 10/1986 | Netherlands | 224/30 A |

OTHER PUBLICATIONS

"Maptrap" ad, p. 94, Bicycling Magazine, Jan.-Feb. 1981.
"Carte Carrier" ad, Pal Products.

Primary Examiner—Linda J. Scholl

[57] ABSTRACT

A bicycle map holder (14) in combination secondary retention device (14) for the stem (20) and handlebar (19) assembly. Such combination resulting in a virtually vibration and windproof, easily viewable, lightweight map holder (14); also providing user with secondary retention (14) means of stem (20) and handlebar (19) assembly in the event of stem (20) failure at binder bolt (17) area. Use of the map holder (14), mandates use of secondary retention feature, thus negating any rider reluctance to use safety equipment and significantly enhancing enjoyment and safety of the sport.

6 Claims, 3 Drawing Sheets

BICYCLE MAP HOLDER/SECONDARY RETENTION DEVICE

1. FIELD OF THE INVENTION

The invention pertains to a bicycle map holder; specifically a device which reinforces the bicycle's stem assembly and which enables the rider to control the bicycle in the emergency condition presented by stem failure at the binder bolt area; while co-functioning as an easily viewable, lightweight vibration and weather-resistant map holder.

2. PRIOR ART

There has been a need for a map holder suitable for bicycle touring, club rides and the like for some time. Known map holders for cyclists have been noteworthy for their scarcity or else impracticality for bicycling. U.S. Pat. No. 4,800,664, for example, due to its mounting and design, is more practical behind the windshield of a motorcycle than a human powered vehicle where aerodynamics and drop handlebars are important factors.

The "Carte Carrier" and "Map Trap" are also prone to vibration, distortion and wind drag. No patents were discovered for the last two map holders, but literature pertaining to their existence is enclosed.

Prior art such as U.S. Pat. No. 4,043,688 relating to stem reinforcement is comparatively heavy, bulky and otherwise ill-suited for handlebars on adult sport or touring bicycles.

The need for a secondary retention device for the handlebars, aside from the rider's peace of mind on steep downhills, when enormous forces are concentrated on the binder bolt area, has become obvious with recent manufacturers' recall of stem assemblies because of failure at this point. The bicycle stem extension is susceptible to damage from sharp knocks or blows whenever the bicycle is transported, let out for repair or involved in a crash or fall. Such damage may not be readily apparent, but can cause dire consequences to the unsuspecting rider, nevertheless. Current trends in handlebar design exert greater stress than ever, further emphasizing the need for the present invention.

The present invention uses the means which reinforce the steam and provide secondary retention of the handlebar to overcome the problems of vibration, distortion and aerodynamics inherent in prior bicycle map holder design. A map holder/secondary retention device is unknown to prior art. The advantages of combining such functions in a single, lightweight, aerodynamic unit, however, are many, not the least of which is that the map holder function mandates the use of the secondary retention feature as well.

SUMMARY OF THE INVENTION

The object of the present invention is to function as a superior map holder suited to adult cycle touring; namely, that its use be conducive to safe bicycling, providing a clear, easily viewable means, that it be wind, weather and vibration resistant. Another object of the invention is to be a secondary retention device for the handlebar at a particularly vulnerable point, the binder bolt area of the stem extension. The same members that support the map also reinforce the steam; its connecting means are of such fashion and strength, they not only insure solid mounting and vibration-free viewing of the map, but retain the handlebars in the event of binder bolt area failure, transmitting shock along the reinforcing plate to the solid portion of the stem. A further object is that the invention attenuates road shock to the bicyclist's hands and arms making the bike easier to control and the cyclist less fatigued. Further, there is the considerable advantage that using the map holder mandates utilizing the secondary retention device; thus negating any reluctance to use safety equipment by the cyclist.

These and other advantages and novel features of the invention will become apparent from the following detailed description and drawings.

DETAILED DESCRIPTION OF THE INVENTION

Figure 1:
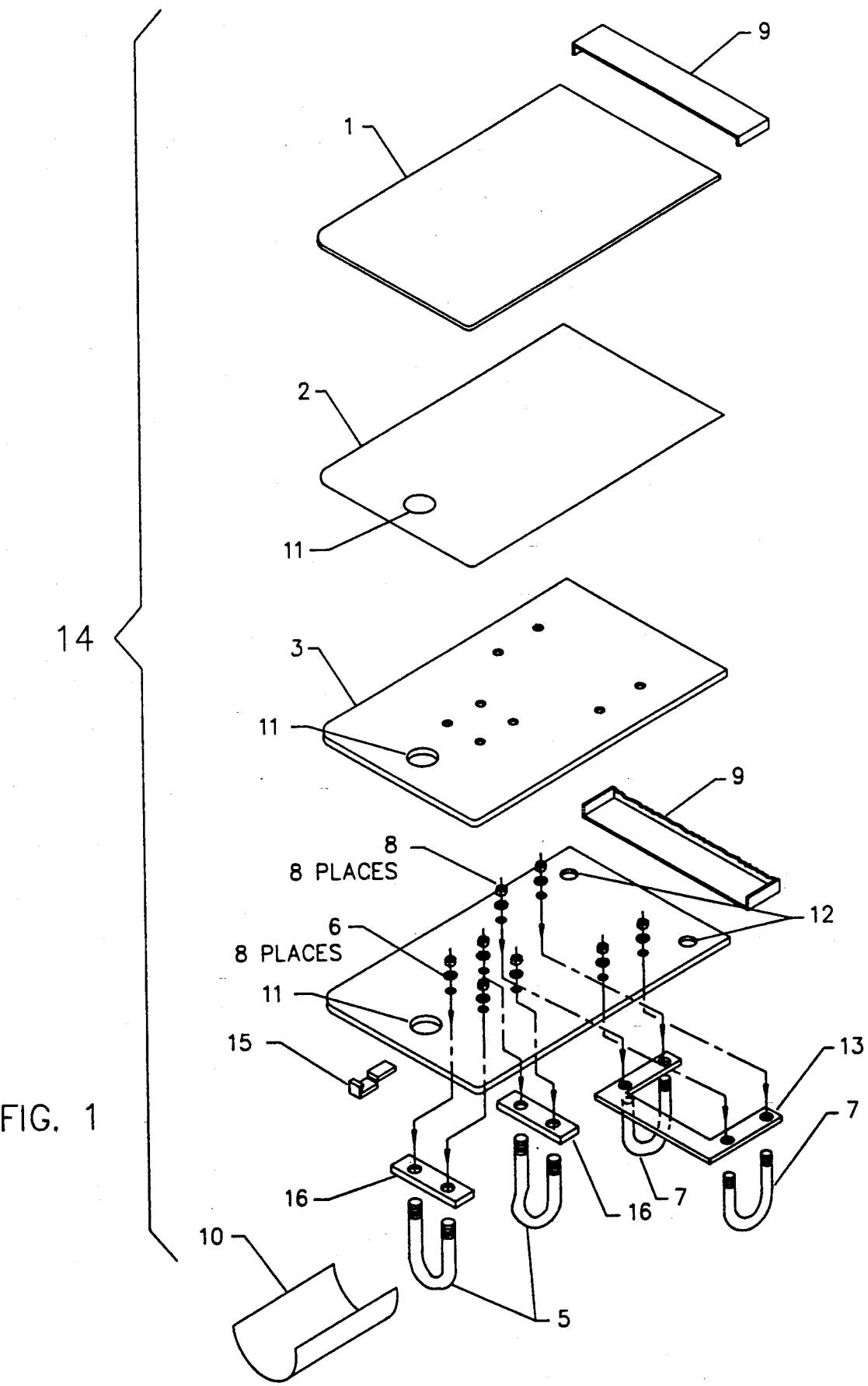
FIG. 1—A side perspective, exploded view of the instant invention, showing all parts of the present embodiment.
Figure 2:
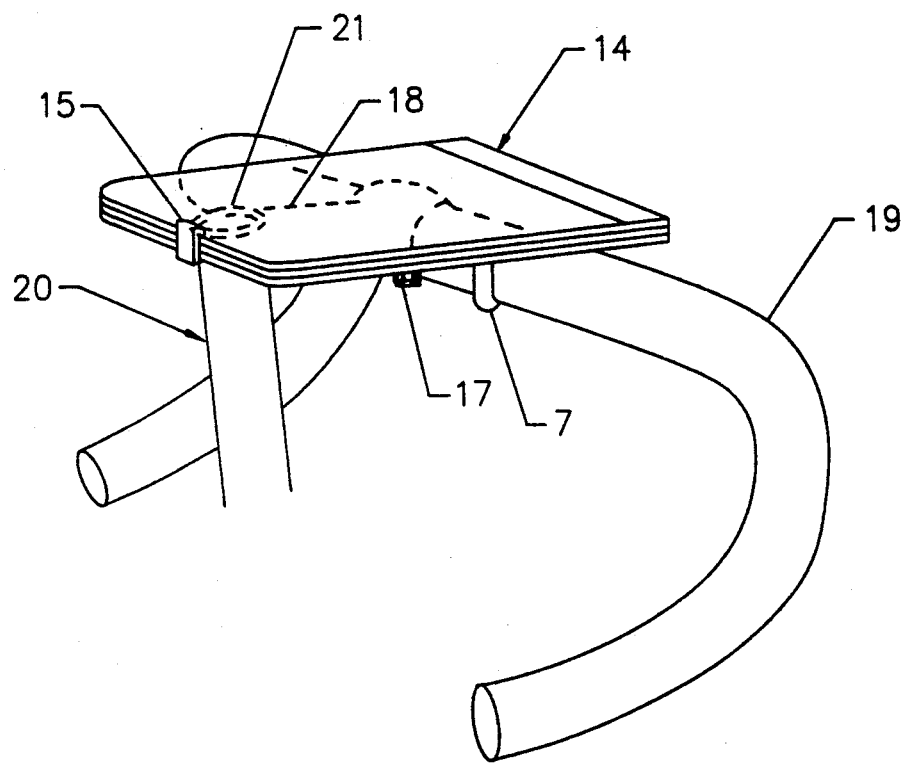
FIG. 2—A side perspective view of the present invention, mounted on the bicycle's stem and handlebar.
Figure 3:
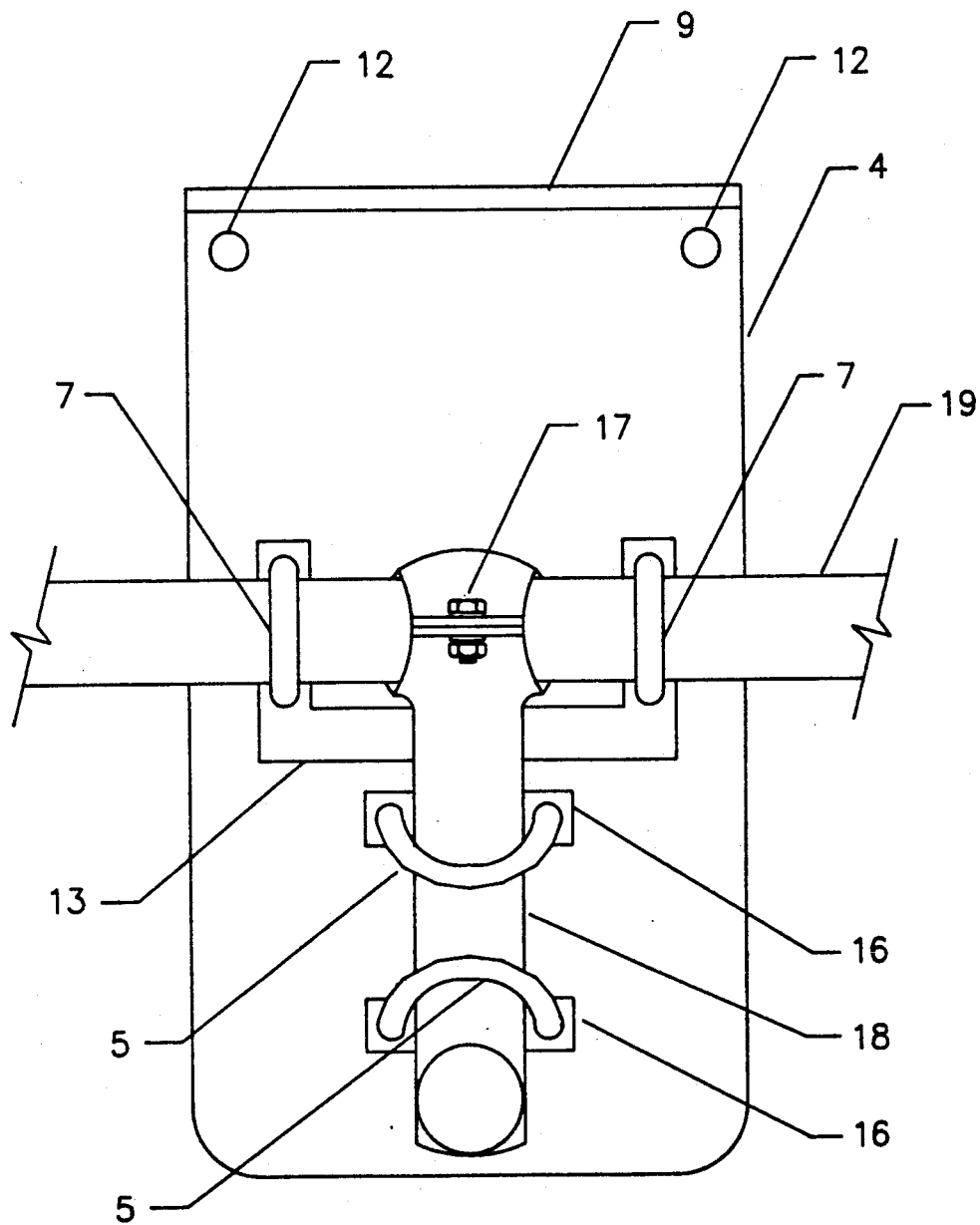
FIG. 3—A view of the underside of the invention showing preferred mounting mode.

Refer now to FIGS. 1, 2 and 3 which are overall drawings of a preferred embodiment of the invention.

FIG. 1—Shows the relationship of all parts of the preferred embodiment (14) and FIG. 2 indicates the invention mounted on a bicycle.

FIG. 3 shows important mounting details that illustrate the secondary retention characteristic of the invention.

The key component of the invention is the reinforcing plate (4). It is, in this embodiment, made of 6061T alloy, approximately 0.2" thick. Bar connecting links (7) attach it to the handlebar (19). These links fit through a bar support shim (13), which as we see in FIG. 3, is shaped similar to an angular letter "C", the two smaller arms of which fit between the handlebar (19), and the reinforcing plate; the long portion of the shim (13) connects these two arms and is parallel to the handlebar (19), generally on that portion of the steam extension just prior to the bulge formed by the juncture of the stem (18) and handlebar (19). The top planar part of this shim (13) consists of approximately an 0.08" thickness of 6061T alloy bonded to a 0.22" thickness of medium density rubber. The purpose of the bar support shim (13) is to establish a mounting surface which will allow for the bulge of the handlebar (19) and stem juncture under the center part of the reinforcing plate (4), and also to absorb vibration. Stem connecting links (5), attach the reinforcing plate (4), to the rear portion of the stem extension (18). Each link is made of steel and is just below its threaded part, offset longitudinally approximately 8° toward each other; they fit the stem extension (18) snugly being approximately 0.89" wide. The resilient shim (10) of pliable rubber 0.01" thick is used to remove any play between the stem connecting link (5) and the stem extension (18) if needed. Clear plastic tubing fitted over the links may also be used for the same purpose. The offset gives better control when the binder bolt section (17) fails. These stem links (5) are fitted through medium density rubber shims (16) approximately 0.1" to 0.2" thick placed between the stem extension (18) and the reinforcing plate (4). The purpose of these stem connecting link shims (16) is to absorb shock and vibration.

In the event of failure at the binder bolt area (17), a transference of forces occur from the handlebar (19) via the bar connecting links (7) and the bar support shim (13) along the reinforcing plate (4) and through the stem-connecting links (5) to the undamaged part of the stem extension; the shims (16) and (13) and the offset angle of the steam connecting links have proved to be important in attenuating the initial shock when the handlebar (19) loses support of the normal stem retention enabling the rider to adequately control and safely stop the bicycle.

The mapholder function is based on this substantial, vibration insulated, mounting of the reinforcing plate to the stem (20) and handlebar (19). The only normally moving parts in this invention are the viewing lens (1), which is of approximately ¼" thick plexiglass or similar material, and opens to insert a map, rotating about an axis established by the hinge (9) and reinforcing plate (4); and the movement of a tension-type plastic closure (15), which is epoxy bonded to the bottom center, rear edge of the reinforcing plate (4), and rotates approximately 180° up and over the edge of the viewing lens (1), retaining it shut. The hinge (9) is of flexible plastic epoxy bonded to the leading edge of the viewing lens (1) and reinforcing plate (4), overlapping approximately 0.5" the top and bottom portions respectively, including the thickness of the backing surface (2) and vibration attenuator (3), thus presenting an aerodynamic surface. On the bottom portion, approximately 1.0" from the side and the leading edge of the reinforcing plate (4), are located two standard machine threaded accessory mounting holes whereby useful accessories such as a light, windscreen, or similar may be conveniently attached.

The mapholder function uses the vibration attenuator (3), a medium density rubber mat, to further dampen vibration and also, by the resilience of the rubber sandwiched between the viewing plate (1) and reinforcing plate (4), tensioning and thus holding the map securely and free from wrinkles. The vibration attenuator (3) is approximately 0.22" thick, contact connected to the reinforcing plate (4) and drilled to accommodate any protrusions or fastener therefrom which attach the bar (13) and stem connecting links (5). A backing surface (2) consisting of a thin, approximately 0.01" plastic or fiberglass sheet, whose purpose is to cover any holes which may extend through the vibration attenuator (3), is contact cemented to same. The viewing lens (1), backing sheet (2), vibration attenuator (3), and the reinforcing plate (4), as can be seen from FIG. 1, generally match each other in planar shape, and have the corner of their surfaces opposite the hinge rounded or curved, so no sharp edges exist to injure the rider.

The reinforcing plate also has an access hole (11), as does the vibration attenuator 3, and backing surface (2) all congruent to each other to allow access to the stem adjusting bolt (21).

Variations of the above cited embodiment are clearly possible; however, material comprising the reinforcing plate must have sufficient strength to absorb and attenuate forces of binder bolt (17) area failure and reinforce the remaining stem extension (18) for support, as must the connecting links (5) and (7).

Thus, castings of various alloys and synthetic moldings, even incorporating connecting links (5) and (7) in their design, or adjustable slots for various length stems are obviously within the scope of what has been herein set forth.

The foregoing description of the preferred embodiment of the invention has been presented for the purposes of illustration and description. It is not intended, therefore, to be exhaustive or to limit the invention to the exact form disclosed. Many modifications and variations are possible, in view of the above teaching. It is hoped and intended that the scope of the invention be limited not by this detailed description but rather by the claims appended hereto.

Having thus set forth and disclosed the nature of my invention, what is claimed is:

1. An apparatus for holding a map and providing secondary retention between a stem and handlebar of a bicycle comprising:
    a reinforcing plate sized to hold a map and maintain steering capabilities when a primary connection between said stem and handlebar fails;
    means for connecting said plate to the handlebar of said bicycle;
    means for connecting said plate to the stem of said bicycle;
    a layer of material sized to fit over and cover said reinforcing plate, providing means for attenuating the vibrations occurring from said bicycle to said map;
    and a transparent cover sized to fit over and cover said layer of material.

2. The apparatus of claim 1 further comprising:
    a sheet of backing material positioned between said first layer of material and said transparent cover wherein said map rests on top of said sheet of backing material.

3. The apparatus of claim 1 further comprising:
    means for mounting accessories to said reinforcing plate.

4. An apparatus for holding a map, said apparatus providing reinforcement of a bicycle's stem and handlebar comprising:
    a reinforcing plate sized to hold a map and provide structural reinforcement of said stem whereby steering capability of said bicycle may be maintained should a primary connection between said stem and handlebar fail;
    means for connecting said reinforcing plate to said handlebar;
    means for connecting said reinforcing plate to said stem;
    a layer of material over which said map is adapted to be placed, sized to fit over said reinforcing plate, said layer of material providing means for attenuating vibrations occurring from said bicycle to said map;
    and a transparent cover sized to fit over said layer of material.

5. The apparatus of claim 4 further comprising:
    a sheet of backing material positioned between said first layer of material and said cover whereby said map rests on top of said sheet of backing material.

6. The apparatus of claim 4 further comprising:
    means for mounting accessories to said reinforcing plate.

* * * * *

UNITED STATES PATENT AND TRADEMARK OFFICE
CERTIFICATE OF CORRECTION

PATENT NO. : 5,106,001

DATED : Apr. 21, 1992

INVENTOR(S) : Paul A. Figinski

It is certified that error appears in the above-identified patent and that said Letters Patent is hereby corrected as shown below:

The title page should be deleted to appear as per attached title page.

Column 1, line 46, "steam" should read --stem--.

Column 1, line 65, "steam" should read --stem--.

Column 3, lines 14 and 15, delete "The only normally moving parts in this invention are" and insert --To this is hinged a--.

Signed and Sealed this

Thirtieth Day of June, 1992

Attest:

DOUGLAS B. COMER

Attesting Officer     Acting Commissioner of Patents and Trademarks

United States Patent [19]
Figinski

[11] Patent Number: 5,106,001
[45] Date of Patent: Apr. 21, 1992

[54] BICYCLE MAP HOLDER/SECONDARY RETENTION DEVICE

[76] Inventor: Paul A. Figinski, Monkton, Md.

[21] Appl. No.: 638,214

[22] Filed: Dec. 31, 1990

[51] Int. Cl.⁵ .................. B62J 11/00; B62J 27/00
[52] U.S. Cl. ...................... 224/31; 224/30 A; 224/41; 40/904; 280/288.4
[58] Field of Search ............ 224/30 R, 30 A, 31, 224/32 R, 36, 39, 41; 40/904; 280/29, 200, 263, 274, 281.1, 288.4

[56] References Cited

U.S. PATENT DOCUMENTS

| | | | |
|---|---|---|---|
| 2,321,192 | 6/1943 | Fischer | 224/36 |
| 4,043,688 | 8/1977 | Humlong | 403/209 |
| 4,800,664 | 1/1989 | Marstall | 224/30 A |
| 4,828,151 | 5/1989 | Goss | 224/30 A |

FOREIGN PATENT DOCUMENTS

| | | | |
|---|---|---|---|
| 3411022 | 10/1985 | Fed. Rep. of Germany | 224/36 |
| 600560 | 11/1925 | France | 224/41 |
| 7702417 | 9/1977 | Netherlands | 224/36 |
| 8500659 | 10/1986 | Netherlands | 224/30 A |

OTHER PUBLICATIONS

"Maptrap" ad, p. 94, Bicycling Magazine, Jan.-Feb. 1981.
"Carte Carrier" ad, Pal Products.

Primary Examiner—Linda J. Scholl

[57] ABSTRACT

A bicycle map holder (14) in combination secondary retention device (14) for the stem (20) and handlebar (19) assembly. Such combination resulting in a virtually vibration and windproof, easily viewable, lightweight map holder (14); also providing user with secondary retention (14) means of stem (20) and handlebar (19) assembly in the event of stem (20) failure at binder bolt (17) area. Use of the map holder (14), mandates use of secondary retention feature, thus negating any rider reluctance to use safety equipment and significantly enhancing enjoyment and safety of the sport.

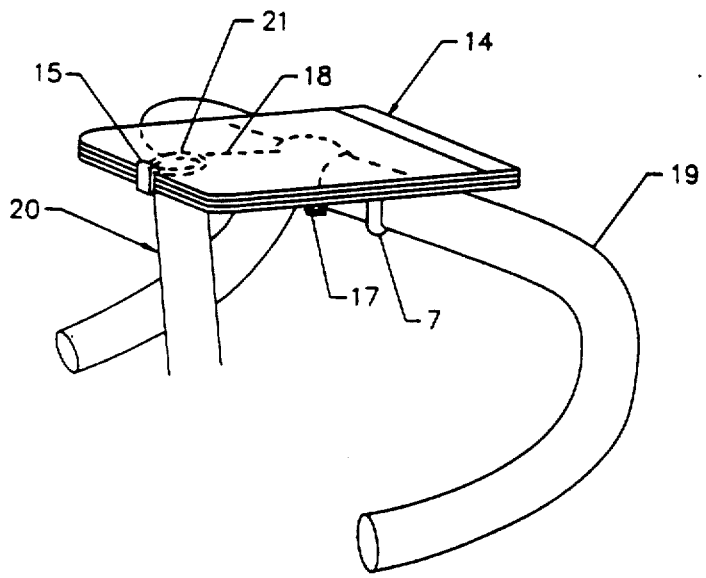

6 Claims, 3 Drawing Sheets